J. F. FRANKLIN.
GEAR.
APPLICATION FILED NOV. 13, 1919.

1,343,047.

Patented June 8, 1920.

Inventor
John F. Franklin
By James J. Heeny Co.,
Attorneys

UNITED STATES PATENT OFFICE.

JOHN F. FRANKLIN, OF DLO, MISSISSIPPI.

GEAR.

1,343,047.  Specification of Letters Patent.  Patented June 8, 1920.

Application filed November 13, 1919. Serial No. 337,692.

*To all whom it may concern:*

Be it known that I, JOHN F. FRANKLIN, a citizen of the United States, residing at Dlo, in the county of Simpson and State of Mississippi, have invented new and useful Improvements in Gears, of which the following is a specification.

My present invention pertains to locomotive drive wheels and consists of an improvement on my locomotive drive wheel, shown and described in my former Letters-Patent dated September 24, 1912, and numbered 1,039,668.

The invention contemplates an improvement over said patent whereby breaking of the bolts that connect the gear to the spokes is precluded should the wheel become derailed during operation.

Experience has taught that when the wheel leaves the rail, the bolts above mentioned are generally broken off for the reason that they receive the force of the impact, and it is to overcome this breaking of the bolts and consequent injury to the wheel and gear that I have devised my improvements.

The invention in all of its details will be fully understood from the following description and claims when the same are read in connection with the drawings, accompanying and forming part of this specification, in which:

Similar numerals of reference designate corresponding parts in all of the views of the drawings.

Figure 1:
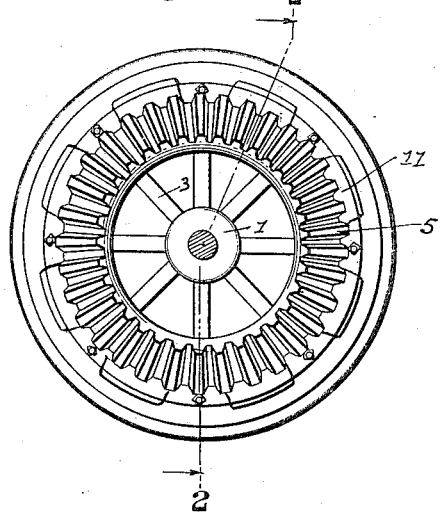
Figure 1 is a side elevation of a locomotive drive wheel embodying my invention.
Figure 2:
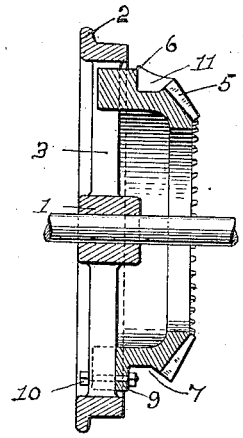
Fig. 2 is a diametrical section of the same.
Figure 3:
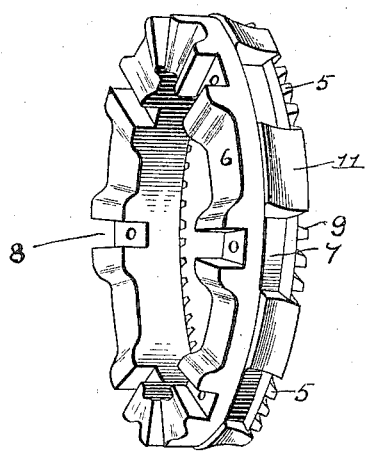
Fig. 3 is a perspective view with the rim of the wheel removed.
Figure 4:
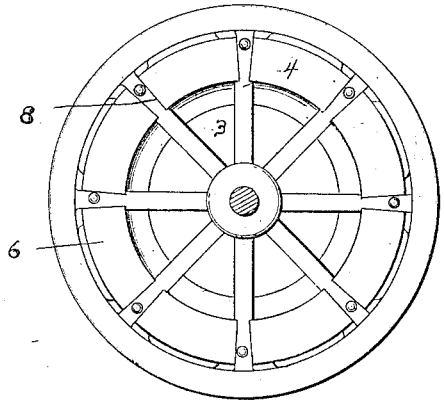
Fig. 4 is a detail elevation of the opposite side of the wheel to that shown in Fig. 1.

Similar to the gear of my patent *supra*, the present gear is annular in form and approximately 24" in diameter and is cast in one piece, and it comprises a hub 1, rim 2 and spokes 3, the said spokes being provided with dove-tail portions 4 intermediate their lengths. On the inner face of the gear I provide the beveled toothed portion 5 and the inwardly directed flange 6; said portion 5 and flange 6 being joined and spaced apart by the circumferential groove 7.

As clearly shown in the drawings, I provide in the outer face of the flange 6, the radial notches 8 that receive the intermediate dove-tail portions 5 of the spokes 3 and within the back walls of the said notches of the flange 6, I provide transverse apertures 9 for the reception of bolts 10 that are provided for the purpose of securing the gear to the spokes.

All of the above described elements are similar to those of my patent *supra* and are arranged and have the same advantages as those of said patent with the exception of the circumferential groove 7.

This groove 7 instead of being continuous completely around the wheel, has a block or portion 11 cast integral therewith approximately 2½" on each side of the bolts 10 in said groove; which in practice will leave a grooved space of approximately 5" around the bolt apertures 9 whereby a person may readily employ a wrench or other tool on the nut of the bolt 10. By preference the said block or portion 11 may extend approximately 1" above the flange 6 so as to compensate for wear or for "dressing" down purposes.

It will be readily appreciated that when the gear is provided with the block or portion 11, should the wheel become derailed at any time, the groove portion 7 will be prevented from contacting with the rails and in so doing break off the bolts 10 causing the gear to become loose. Should the wheel become derailed for any reason, the same would drop down until the blocks 11 contacted with the rail and hence said blocks would not only protect the gear and flange from injury, but would hold the wheel up on the rails.

It will be gathered from the foregoing that the device is simple in construction, inexpensive to construct and may be readily and easily repaired by unskilled labor and will bring about a great saving of not only time but also loss of efficiency of driving gears through injury.

Having described my invention, what I claim and desire to secure by Letters-Patent; is:

1. A locomotive driving gear comprising a hub, a rim, spokes intermediate the hub and rim and having intermediate portions of dove-tail form, a gear of annular form, having a beveled toothed portion and also having a flange separated from said toothed portion by a circumferentially grooved portion, blocks formed at intervals within the circumferentially grooved portion; said gear being provided in its face with radial dove-tail notches that snugly receive the dovetailed portions of the spokes, and connecting bolts extending through registered apertures in the spokes and back walls of the notches; said bolts being spaced from the blocks of the circumferentially grooved portion.

2. In a drive wheel, a hub, a rim, spokes intermediate the hub and rim, a gear of annular form, having a beveled toothed portion, a flange provided in the gear, a circumferentially grooved portion provided between the toothed portion and the flange, and blocks formed integrally therewith and spaced apart throughout the circumference of the grooved portion.

3. In a drive wheel for locomotives, the combination of a hub, a rim, spokes intermediate the hub and rim, a gear of annular form, a beveled toothed portion provided on the gear, a flange separated from and connected with the toothed portion by a circumferentially grooved portion, blocks formed integral with and spaced apart throughout the circumference of the groove, said flange having radial notches in its face that receive and snugly retain the spokes, and bolts that connect the spokes to the flange being arranged within the blocks of the groove.

In testimony whereof I have hereunto set my hand in presence of two subscribing witnesses.

JOHN F. FRANKLIN.

Witnesses:
W. H. McIntosh,
B. E. Dawson.